United States Patent [19]

Saam et al.

[11] 4,355,154
[45] Oct. 19, 1982

[54] METHOD FOR PREPARING CONDENSATION POLYMERS BY EMULSION POLYMERIZATION

[75] Inventors: John C. Saam; Yungnien J. Chou, both of Midland, Mich.

[73] Assignee: Dow Corning Corporation, Midland, Mich.

[21] Appl. No.: 308,961

[22] Filed: Oct. 6, 1981

[51] Int. Cl.³ .............................................. C08G 63/22
[52] U.S. Cl. ................................... 528/274; 528/288; 528/293
[58] Field of Search ......................... 528/274, 288, 293

[56] References Cited

U.S. PATENT DOCUMENTS 3,641,111  2/1972  Lazarus ........................... 528/274 X
3,787,370  1/1974  Shima et al. ........................ 528/274

OTHER PUBLICATIONS

Goodman, I. & Rhys, J. A. Polyesters, vol. I, Saturated Polymers, American Elsevier Publishing Co., Inc., N.Y., (1965), Chapter 2, pp. 13-37.

*Primary Examiner*—Lucille M. Phynes
*Attorney, Agent, or Firm*—Robert Spector

[57] ABSTRACT

Polyesters are prepared by reacting aqueous compositions containing an emulsified hydroxyacid or an emulsified mixture comprising a polyfunctional carboxylic acid or anhydride and a polyfunctional alcohol. The emulsion also contains a suitable polycondensation catalyst. The resultant polyesters are useful as plasticizers and as precursors for alkyd resins and other polymers.

40 Claims, No Drawings

METHOD FOR PREPARING CONDENSATION POLYMERS BY EMULSION POLYMERIZATION

BACKGROUND OF THE INVENTION

This invention relates to the preparation of synthetic organic polymers. More particularly, this invention relates to the preparation of polyesters from hydroxycarboxylic acids or from polyfunctional alcohols and carboxylic acids.

Condensation polymers derived from di- and polyfunctional alcohols include, among others, saturated and unsaturated polyesters, polyester-amides, polyurethanes and polyacetals. Polyesters are a particularly preferred class of condensation polymers because their properties make them suitable for a variety of end-use applications including textile fibers, films, coatings and engineering plastics. By judiciously selecting monomers and polymerization conditions, it is possible to optimize those properties desired for a particular end use.

A conventional method for preparing polyesters and other condensation polymers derived from hydroxyl-containing monomers is by direct esterification, whereby the appropriate monomers, usually polyhydric alcohols or phenols and aliphatic, cycloaliphatic or aromatic polycarboxylic acids are reacted while removing the water formed as a by-product of the esterification reaction. The conditions required to obtain polyesters of the desired molecular weight are disclosed in numerous patents and texts. Specific procedures for preparing representative polyesters and other condensation polymers are described in a text entitled: "Preparative Methods of Polymer Chemistry" by W. R. Sorenson and T. W. Campbell (Interscience Publishers, New York, 1961). All of the procedures for polyesters disclosed in this publication require maintaining the reagents in a molten state throughout the polymerization reaction. In many instances the water produced as a by-product of the reaction is continuously removed during the polymerization.

It is known that the reaction between an alcohol and a carboxylic acid or ester involves an equilibrium that can be represented by the equation

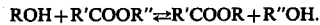

$$ROH + R'COOR'' \rightleftharpoons R'COOR + R''OH.$$

In the foregoing equation R and R' are hydrocarbyl groups and R'' represents a hydrocarbyl group or a hydrogen atom. When R'' is hydrogen, the reaction is referred to as a "direct esterification". The reaction with a compound wherein R'' is a hydrocarbyl group is referred to as a "transesterification", since the alcohol residue present on the initial ester, R'COOR'', is replaced by the residue of the alcohol ROH. When R'' is hydrocarbyl it is preferably methyl or ethyl to facilitate removal of the free alcohol, R''OH, that is produced as a by-product of the reaction. Irrespective of whether R'' is hydrocarbyl or hydrogen, the prior art teaches that removal of the R''OH by-product is essential to avoid hydrolysis or alcoholysis of the desired ester. This requirement also applies to polyesterification reactions, the only difference being that the carboxylic acid and the alcohol represented by ROH in the foregoing equation are polyfunctional.

It is also well known that the molecular weight of a polyester formed by direct esterification is determined to a large extent by the efficiency with which the by-product is removed from the reaction mixture. If the desired molecular weight is relatively low, the water or alcohol can be evaporated or distilled under atmospheric pressure from a reaction mixture wherein the reagents are in molten form and at a temperature of from about 150° to 250° C. This process can often be facilitated if an inert gas is passed through the reactor. To achieve the higher molecular weights desired for textile fiber production, it is usually necessary to either completely remove the water or alcohol under reduced pressure or employ an organic solvent that forms an azeotropic mixture with these by-products.

One disadvantage inherent in the foregoing prior art teachings is that the energy input required to remove all but trace amounts of the R''OH by-product substantially increases the cost of manufacturing polyesters.

A second disadvantage associated with preparing condensation polymers by conventional bulk and solution polymerization techniques is that the high viscosity exhibited by these products makes them difficult to transfer and process.

One method for avoiding the problems associated with the manufacture and processing of relatively high molecular weight polymers in molten or solubilized form is to employ a technique known as emulsion polymerization whereby one or more monomers are reacted in an aqueous medium containing a catalyst and, usually, a surfactant. The final polymer is obtained as an aqueous emulsion or latex exhibiting a relatively low viscosity, sometimes approaching that of water. Heretofore emulsion polymerization employing water as the continuous phase has been employed substantially exclusively for the polymerization of ethylenically unsaturated compounds in the presence of free radical sources, such as organic peroxides. Since the presence of even small amounts of water during condensation polymerizations involving polyhydric alcohols and polycarboxylic acids has been shown to substantially reduce the molecular weight of the resultant polyester, emulsion polymerization in aqueous media has heretofore not been considered a practical means for preparing condensation polymers in general, and particularly polyesters and other polymers derived from polyfunctional alcohols.

It is known to prepare certain types of condensation polymers, particularly polyamides, by interfacial polymerization. In accordance with this method, an aqueous phase containing a solubilized or emulsified diamine such as hexamethylene diamine, usually in the form of the corresponding sodium salt, is combined with a water-immiscible organic liquid such as methylene chloride containing a solubilized diacyl halide such as sebacoyl dichloride. A relatively rapid formation of solid polymer occurs at the interface between the two liquid layers. If the reaction is to proceed to completion, the polymer must be continuously removed from the area of the interface by stirring the reaction mixture or by withdrawing the polymer from the interfacial region as the reaction progresses.

Polyfunctional carboxylic acids or their corresponding anhydrides are not used for interfacial polymerization because these compounds do not have the required high level of reaction rate exhibited by the corresponding acyl halides. The acyl halides react so rapidly that no catalyst is required. By comparison, the reaction of polyfunctional carboxylic acids with di- or polyhydric alcohols requires a polycondensation catalyst to achieve a useful reaction rate.

3

Since both interfacial polymerization, as it has been applied to the formation of polyamides, and emulsion polymerization employ an aqueous phase, this relatively large amount of water would be expected to displace the equilibrium of the polyesterification reaction in the direction of degradation of any polymer formed to the corresponding polyfunctional carboxylic acid and alcohol. It is therefore not obvious to employ either of these techniques as a means for preparing commercially useful polyesters.

Surprisingly it has now been found that polyesters wherein the average number of repeating units per molecule is as high as 20 or more can be prepared by emulsion polymerization in aqueous media and in the presence of specified polycondensation catalysts.

SUMMARY OF THE INVENTION

The present invention provides polyesters derived from the reaction in aqueous media of an emulsified hydroxycarboxylic acid or an emulsified mixture comprising a monomeric or oligomeric polyfunctional alcohol and a monomeric or oligomeric polyfunctional carboxylic acid. The reaction is conducted in the presence of at least one member of a specified group of polycondensation catalysts. The emulsion optionally contains a cationic, anionic or nonionic surfactant as an emulsion stabilizer.

DETAILED DESCRIPTION OF THE INVENTION

This invention provides polyesters that are prepared by (1) combining a liquid aqueous medium with at least one emulsifiable polyester precursor and an effective amount of at least one polycondensation catalyst and (2) reacting the resultant emulsion at a temperature at which the precursor is emulsifiable for a period of time sufficient to form said polyester, wherein said polyester precursor comprises at least one member selected from the group consisting of hydroxycarboxylic acids containing at least 8 carbon atoms and mixtures comprising a polyfunctional alcohol containing at least 6 carbon atoms and a polyfunctional carboxylic acid containing at least 5 carbon atoms or the corresponding carboxylic acid anhydride and wherein said polycondensation catalyst comprises at least one member selected from the group consisting of mineral acids, organic sulfonic acids, esters of sulfuric acid, alkali metal salts and esters of organic sulfonic acids, alkali metal salts of sulfuric acid half esters wherein the alcohol residue contains at least 12 carbon atoms and mixtures comprising (a) an ester of sulfuric acid wherein the alcohol residue contains at least 12 carbon atoms, an alkali metal salt of a sulfuric acid half ester or a cationic surfactant and (b) an alkali metal salt of sulfuric acid.

As used in this specification and the accompanying claims, "emulsifiable" is defined as the ability of the aforementioned polyester precursor to form an oil-in-water emulsion when combined with water and one of the present polycondensation catalysts under the conditions to be employed for the polymerization reaction. A simple test to determine whether a given polyester precursor meets this criterion is to combine the precursor in liquid form with sufficient water to achieve a precursor concentration of from about 5 to about 80% by weight of precursor. Formation of a water-immiscible liquid phase indicates that the precursor can be polymerized in accordance with the method of this invention at the temperature of the aqueous medium employed to conduct the test. The nonaqueous phase may be continuous, such as the one obtained by combining equal volumes of benzene and water, or it may be present as a discontinuous phase, such as a dispersion or emulsion, within the aqueous phase. If only a single liquid phase appears to be present, the temperature of the composition should be reduced gradually to just above its freezing point while it is visually examined to detect formation of a water-insoluble phase. In some instances the particle size of the water-insoluble phase may be so small as to be detectable only by using a turbidometer or ultramicroscope. These and other techniques for detecting the presence of microscopic dispersed particles in a liquid medium are well known in the art, and do not form part of this invention. The presence of even microscopic particles of a water-insoluble liquid phase indicates that the precursor being evaluated can be reacted in accordance with the present method to yield a useful polyester.

The foregoing test may not be applicable if none of the components of the precursor can be liquified at temperatures below about 100° C. In this instance some modification of the test and the general polymerization method may be necessary. In accordance with one such modification a small amount of a water-immiscible liquid in which at least a portion of the precursor is soluble is added to the water. Alternatively, an emulsion can sometimes be formed by heating the precursor above the melting point of at least one component thereof, combining the melt with warm water and passing the resultant composition through a homogenizer. These modifications would be obvious to one skilled in the art of preparing aqueous emulsions, and therefore are within the scope of the present method.

The repeating units of polyesters prepared by emulsion polymerization in accordance with the method of this invention are selected from at least one member of the group consisting of

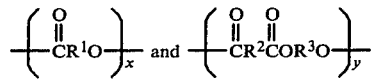

where x and y are each 0 or an integer greater than 1, with the proviso that x and y cannot both be 0;

$R^1$ represents hydrocarbylene or substituted hydrocarbylene and is linked to the oxygen atom through an aliphatic or cycloaliphatic carbon atom;

$R^2$ represents a carbon to carbon single bond, hydrocarbylene or substituted hydrocarbylene and $R^3$ represents hydrocarbylene or substituted hydrocarbylene and is linked to the two oxygen atoms through aliphatic or cycloaliphatic carbon atoms.

Alternatively, $R^2$ and $R^3$ individually or both represent a series of 2 or more identical or different hydrocarbylene groups joined by a linking group. Typical groups include

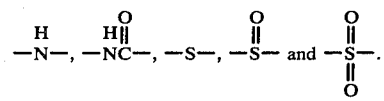

It will be understood that when the hydrocarbylene groups represented by $R^1$, $R^2$ and $R^3$ contain substituents, these can be reactive or unreactive under the conditions employed to prepare polyesters in accordance with the present method.

In a narrower embodiment of this invention, $R^1$ represents unsubstituted or substituted alkylene containing from 2 to 20 carbon atoms, unsubstituted or substituted alkenylene containing from 2 to 20 carbon atoms, unsubstituted or substituted cycloalkylene containing from 5 to 8 carbon atoms, $-C_mH_{2m}DC_nH_{2n}-$ or $-C_mH_{2m}EC_nH_{2n}-$ where D represents cycloalkylene containing from 5 to 8 carbon atoms, E is arylene and m and n are individually selected integers from 1 to 8 inclusive;

$R^2$ represents a carbon to carbon single bond, unsubstituted or substituted alkylene containing from 1 to 20 carbon atoms, unsubstituted or substituted alkenylene containing from 2 to 20 carbon atoms, unsubstituted or substituted cycloalkylene containing from 5 to 8 carbon atoms, arylene, $-C_pH_{2p}D'C_qH_{2q}-$ or $-C_pH_{2p}E'C_qH_{2q}-$ where D' represents cycloalkylene containing from 5 to 8 carbon atoms, E' represents arylene and p and q are individually selected integers from 1 to 8 inclusive; and $R^3$ represents unsubstituted or substituted alkylene containing from 6 to 20 cabon atoms or $R^3$ is

where $R^4$ is alkylene containing from 2 to 20 carbon atoms, $R^5$ is hydrocarbylene containing from 6 to 20 carbon atoms and r is an integer from 1 to 20.

In the foregoing definitions for $R^1$, $R^2$ and $R^3$, any arylene is preferably 1,2-, 1,3- or 1,4- phenylene and any cycloalkylene is preferably 1,2- or 1,4-cyclohexylene.

In preferred embodiments of this invention one of x or y is 0 and the other represents an integer from 2 to about 20, $R^1$ is alkylene containing from 8 to 20 carbon atoms, $R^2$ is alkylene containing from 2 to 20 carbon atoms, alkenylene containing from 2 to 8 carbon atoms or phenylene and $R^3$ is alkylene containing from 6 to 20 carbon atoms, hydroxy-substituted alkylene containing from 6 to 20 carbon atoms or

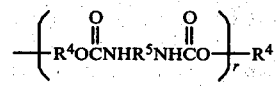

where $R^4$ is alkylene containing from 8 to 12 carbon atoms, $R^5$ is alkarylene, most preferably ortho- or para-tolylene, and r is as previously defined.

The preference for certain reagents is based on their availability and cost and/or the ease of preparing useful polyesters by emulsion polymerization using these reagents.

Most preferably $R^1$ represents the residue remaining following removal of the carboxy (—COOH) and hydroxyl groups from 12-hydroxystearic acid. This residue can be represented by the formula

$R^2$ most preferably represents —CH=CH—, alkylene containing from 2 to 12 carbon atoms or 1,2-phenylene and $R^3$ is most preferably alkylene containing from 8 to 12 carbon atoms or the residue remaining following removal of two hydroxyl groups from an oligomeric reaction product of styrene and allyl alcohol containing an average of 10 repeating units per molecule. A compound of this type is available as X-450 from the Shell Chemical Company, a division of Shell Oil Company, New York.

As used in this specification, the term "hydrocarbylene" includes all divalent groups that can be obtained by removing two hydrogen atoms from an aliphatic, cycloaliphatic or aromatic hydrocarbon. When the hydrocarbylene group is alkylene, it can be linear or branched. Representative alkylene groups include methylene, ethylene, propylene, n-butylene, isobutylene, 1,5-amylene, 1,3-amylene,

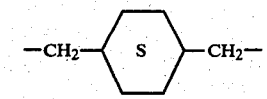

and the isomeric hexylene, octylene, decylene, dodecylene and octadecylene groups. When the hydrocarbylene is cycloalkylene it can be, for example, 1,4-cyclohexylene, 1,3-cycloheptylene or 1,4-cyclooctylene. Hydrocarbylene groups containing a phenyl ring include phenylene, tolylene,

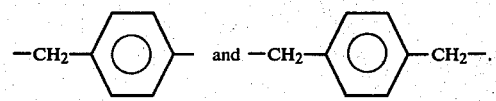

The hydrocarbylene groups represented by $R^1$, $R^2$ and $R^3$ may contain one or more substituents that can be either inert or reactive during the polymerization reaction. Inert substituents include nitro, halo, hydrocarbyloxy, thiohydrocarbyloxy, and hydrocarbonyl

where $R^6$ represents a hydrocarbyl group containing from 1 to 20 carbon atoms. The halo substituents can be chloro, bromo or iodo.

Potentially reactive substituents include carboxy (—COOH), hydroxyl, isocyanato (—N=C=O), which may be free or blocked, and amino groups. Depending upon the stoichiometry of the reagents and the reaction conditions during the emulsion polymerization, these substituents may react with other growing polymer molecules during the course of the polymerization to form a slightly crosslinked structure that is desirable for certain coating applications.

Alternatively, the reactivity of at least some of the potentially reactive groups can be retained throughout the polymerization. These groups would subsequently be reacted with appropriate polyfunctional crosslinking agents such as melamines to form the cured or crosslinked structure desirable for certain end use applications, such as for an alkyd resin.

In accordance with the method of this invention, polyesters are prepared by reacting aqueous compositions containing at least one emulsified polyfunctional carboxylic acid of the general formula HOOCR$^2$COOH or the corresponding anhydride, at least one emulsified polyfunctional alcohol of the formula HOR$^3$OH and a polycondensation catalyst. Alternatively or additionally, the composition contains an emulsified hydroxycarboxylic acid of the formula HOR$^1$COOH.

It will be understood that R$^2$ may contain one or more carboxy groups as substituents and R$^3$ may contain one or more hydroxyl groups.

The desired reactants and polycondensation catalyst are emulsified by combining them with water. The amount of water is usually not critical so long as the polyfunctional alcohol is not appreciably soluble in water. It is usually convenient to employ sufficient water to obtain a concentration of reactants of from about 5 to 80%, preferably from 10 to 50%, based on the total weight of the reaction mixture.

If the monomers, particularly the polyol, are appreciably soluble in water, to achieve a sufficient concentration of monomers in the emulsified phase, the combined monomer concentration in the reaction medium should be from about 40 to 80% by weight. This concentration range is usually applicable to difunctional alcohols containing from 6 to about 9 carbon atoms.

Emulsification of the reactants can usually be achieved by stirring the mixture of reactants, polycondensation catalyst and water at room temperature. In some instances, particularly when employing relatively large quantities of reagents or ones which are not readily emulsifiable, it may be desirable to employ a mechanical homogenizer or ultrasonic device such as a sonic cell disruptor to prepare the emulsion.

Polymerization of the emulsified reactants is achieved by maintaining the emulsion at a temperature of from about 1° C. to to the boiling point of the liquid phase for a period of time sufficient to achieve a substantially complete reaction or an equbrium distribution of molecular weight. Depending upon the reactants and the temperature of the reaction mixture, the time required will be from several minutes to 24 hours or more. The only precaution to be observed is that the reagent or reagents employed must be emulsifiable at the reaction temperature. So long as this criterion is met, any reaction temperature from above the freezing point, preferably above about 1° C., up to the boiling point of the aqueous phase can be employed. If the polymerization is conducted at superatmospheric pressure, the boiling point can be as high as 374° C. Normally, the temperature employed will be from 1° to 100° C., preferably from ambient to about 95° C.

Other criteria which determine the temperature range for a given polymerization reaction are the solubility of the reagents in water at the reaction temperature and the melting points of the reagents.

When employing diols and/or carboxylic acids containing fewer than 10 carbon atoms or a hydroxycarboxylic acid containing fewer than 12 carbon atoms, all of which are appreciably soluble in water, the temperature of the emulsion is preferably maintained at from 1° to about 40° C. Above about 40° C. the solubility of these reagents in the aqueous phase may increase to the extent that their concentration in the oil phase is insufficient to achieve any significant degree of polymerization. In some instances, a reversion of already formed polymer to water soluble monomers and oligomers may occur.

Since all of the reagents must be emulsifiable liquids during the polymerization reaction, the temperature at which this reaction is conducted should preferably be above the melting point of at least one of the reagents and at a level where all reagents are at least partially soluble in the oil phase. The optimum temperature range for a given polyesterification can readily be determined by routine experimentation.

Experimental data indicate that the yield and molecular weight of one type of polyester are maximized when the two difunctional monomers employed to prepare the polyester are present in substantially equimolar amounts in the reaction mixture. While these data do not conclusively demonstrate that this phenomenon is broadly applicable to all polyfunctional carboxylic acids and alcohols useful in the present method, it may be desirable to use these data as a guide when determining the optimum reaction conditions for preparing a given polyester.

The progress of the polymerization can conveniently be followed by periodically titrating aliquot portions of the reaction mixture with a suitable base such as sodium hydroxide to determine the concentration of unreacted carboxylic acid groups. When this value remains relatively constant for a number of successive titrations, it can be assumed that the polymerization reaction is substantially complete.

Since polycondensation products containing more than about 3 repeating units per molecule are generally insoluble in methanol at ambient temperature whereas the other components of the reaction mixture are soluble, adding methanol to a sample of the reaction mixture provides a qualitative means for determining whether a useful polymer is being formed.

Representative emulsifiable polyfunctional carboxylic acids that can be reacted to form polyesters in accordance with the method of this invention contain from five to twenty or more carbon atoms and include suberic, azelaic, 1,8-octanedioic, 1,10-decanedioc, 1,12-dodecanedioic, 1,2-cyclohexanedioic, and the isomeric phthalic acids, which may contain halogen or other groups as substituents on the phenyl ring. Suitable reagents containing more than two carboxy (—COOH) groups per molecule include trimellitic and pyromellitic acids. The corresponding anhydride can be employed in place of any polyfunctional carboxylic acid.

Emulsifiable polyfunctional alcohols that can be reacted to form polyesters in accordance with the method of this invention contain at least six carbon atoms and two or more hydroxyl groups. It has been found that alcohols containing fewer than six carbon atoms are too water soluble to form emulsions even in the presence of relatively water-insoluble polycarboxylic acids.

If it is desired to incorporate water soluble nonemulsifiable polyfunctional alcohols or carboxylic acids into a polyester, one alternative route would be to first react the alcohol or acid with the appropriate polyfunctional reagent to form a low molecular weight hydroxyl-terminated or carboxyl-terminated oligomer containing an average of from about 2 to 5 repeating units per molecule. The oligomer is then emulsified and polymerized in the presence of an emulsifiable polyfunctional carboxylic acid or alcohol at temperatures of from about 1° to 40' C. Preferably the temperature is below ambient to minimize solubility of the reagents in water.

Representative polyfunctional alcohols that can be reacted in accordance with the present method include 1,6-hexanediol, 1,8-octanediol, 1,10-decanediol, 1,12- dodecanediol, the isomeric cyclohexanediols, 1,4-bis(-hydroxymethyl)cyclohexane, 1,2- and 1,4-benzenedimethanol, glycerol, 1,2,4-butanetriol, pentaerthritol and dipentaerthritol. Preferred polyfunctional alcohols include 1,10-decanediol, glycerol and the oligomeric reaction product of styrene and allyl alcohol referred to in the preceeding specification.

Another class of materials that will form polyesters when reacted in accordance with the present method are the oligomeric compounds prepared by reacting a stoichiometric excess of a di- or polyfunctional acid or alcohol with a di- or polyfunctional reagent that will react with these compounds to form chemical bonds. The resultant oligomer contains carboxy or hydroxyl end groups and is subsequently reacted with a polyfunctional alcohol or carboxylic acid, respectively. In a preferred embodiment, a diisocyanate is reacted with a stoichiometric excess of a diol such as 1,6-hexanediol. The resultant hydroxyl-terminated oligomer contains internal urethane linkages,

and is subsequently emulsified together with a stoichiometric amount of a dicarboxylic acid such as phthalic acid, and a polycondensation catalyst. The resultant composition is then reacted to yield a urethane-modified polyester.

In place of all or a portion of the aforementioned polyfunctional alcohols and carboxylic acids, one can employ a hydroxycarboxylic acid containing at least 8 carbon atoms. Suitable hydroxycarboxylic acids include but are not limited to the isomeric hydroxyhexanoic, hydroxyoctanoic hydroxystearic, hydroxyalkyl benzoic and hydroxyalkyl naphthoic acids wherin the hydroxyalkyl groups are preferably hydroxymethyl or hydroxyethyl, this preference being based on the availability of the corresponding hydroxycarboxylic acids.

In accordance with the method of this invention, the reaction of the aforementioned polyfunctional acids, polyfunctional alcohols and hydroxycarboxylic acids is conducted in the presence of a polycondensation catalyst. This catalyst can be a mineral acid, such as hydrochloric, sulfuric, nitric or phosphoric acid. Other suitable polycondensation catalysts include organic sulfonic acids, diesters and half esters of sulfuric acid, alkali metal salts of sulfuric acid half esters, alkali metal salts and esters of organic sulfonic acids and mixtures comprising (a) a first component selected from sulfuric acid esters, alkali metal salts of sulfuric acid half esters and conventional cationic surfactants and (b) a second component selected from the alkali metal salts of sulfuric acid.

Representative sulfonic acids that are commercially available include methanesulfonic, trifluoromethanesulfonic, benzenesulfonic, dodecylbenzenesulfonic, dodecyl diphenyl oxide sulfonic, 5-methyl-1-naphthylenesulfonic and p-toluenesulfonic acids. Suitable esters of sulfuric acid include the lauryl, stearyl, hexadecyl and eicosanyl esters.

Other commercially available catalysts suitable for use in accordance with the method of this invention include lauryl hydrogen sulfate and sodium dodecylbenzene sulfonate.

Conventional cationic surfactants that are available for use as component (a) of the aforementioned catalyst mixtures include quarternary ammonium compounds wherein at least one hydrocarbyl group bonded to nitrogen contains eight or more carbon atoms and the anionic portion of the molecule is hydroxyl or is derived from a strong mineral acid such as sulfuric or hydrochloric acid. Preferably, the anionic portion is sulfate. Commercially available surfactants of the cationic, anionic and nonionic types are listed in the 1980 edition of McCutcheon's Detergents and Emulsifiers, North American Editions, McCutcheon Division, Manufacturing Confectioner Publishing Company, Glen Rock, N.J. 07452.

When any of the aforementioned mixtures are employed as a polycondensation catalyst the weight ratio of component (a) to component (b) can be in the range from 1000:1 to 1:300 respectively. Preferably the range is from 500:1 to 1:100, most preferably from 2:1 to 1:10.

If sulfuric or phosphoric acid is used as the polycondensation catalyst, it has been found that the presence of a cationic, anionic or nonionic surfactant in the reaction mixture is desirable, since the surfactant increases the stability of the emulsion without adversely affecting the activity of the catalyst to any significant extent. The combination of a nonionic surfactant and hydrochloric acid has a similar effect. The relative concentration of surfactant is not critical, however it is usually preferred to employ at least 0.1% of surfactant based on the weight of the polycondensation catalyst. No appreciable additional benefits result from using more than about 200% by weight of surfactant, and the large amount of surfactant may cause excessive foaming of the reaction mixture.

The polycondensation catalysts of this invention are used at concentration levels that will effectively catalyze the polymerization reaction and yield a polyester having a desired combination of properties. The optimum catalyst and concentration level for a given polymerization is dependent on a number of variables, including the types of monomers being reacted and the ultimate degree of polymerization desired. The catalysts are usually present at concentrations of from 0.01 to 30%, based on total monomer weight. To achieve the desired degree of polymerization following a reaction time of 24 hours or less the catalyst concentration is preferably from 0.1 to 20%, most preferably from 0.5 to 10%.

Preferably the polycondensation catalyst is selected from the group consisting of sulfuric acid, hydrochloric acid, phosphoric acid, aliphatic and aromatic sulfonic acids, esters of sulfuric acid, alkali metal salts of aromatic sulfonic acids, and mixtures comprising an alkali metal salt of sulfuric acid and a cationic surfactant.

Representative members from the class of preferred polycondensation catalysts include dodecylbenzenesulfonic acid, lauryl hydrogen sulfate, sodium lauryl sulfate, sodium p-dodecylbenzene sulfonate, the sodium salt of sulfated methyl oleate, p-toluenesulfonic acid, trifluoromethanesulfonic acid, 5-methylnaphthylenesulfonic acid, p-dodecylbenzenesulfonic acid, dodecyl diphenyl oxide sulfonic acid, hydrochloric acid, sulfuric acid, phosphoric acid and mixtures containing sulfuric acid in combination with either hexadecyltrimethylammonium p-toluenesulfonate or an alkylphenoxy polyoxyethylene ethanol which is available under the trade name Makon® 10 from the Stepan Chemical Company, Northfield, Illinois 60093. A particularly preferred catalyst for many polyesters is dodecylbenzenesulfonic acid, this preference being based on the availability and activity of this product and the desirable properties exhibited by the final polymer.

The polyesters prepared by emulsion polymerization in accordance with the method of this invention contain an average of up to 20 or more repeating units per molecule. Polyesters of this type derived from linear diols and aliphatic or aromatic dicarboxylic acids are useful for a variety of applications, including plasticizers for polyvinyl chloride and related vinyl polymers.

Polyesters containing hydroxyl end groups can be reacted with di- or polyfunctional isocyanates to yield ester-modified cellular or elastomeric polyurethanes that which, in turn, are useful as insulating and cushioning materials, in coating compositions and for preparing spandex type fibers.

If an ethylenically unsaturated fatty acid such as soya fatty acid is reacted in an aqueous emulsion together with a dicarboxylic acid or anhydride such as phthalic anhydride and a polyfunctional alcohol containing three or more hydroxyl groups, the resultant air drying alkyd resin can be incorporated into a coating composition. The numerous end-use applications of alkyd resins are well known, and are discussed in detail in the alkyd resin section of the Encyclopedia of Polymer Science and Technology (Interscience Publishers, New York, 1964).

A second type of alkyd resin composition can be prepared by combining a preformed polyester derived from a trifunctional alcohol such as glycerol with a latent crosslinking agent such as a melamine-formaldehyde resin. Coatings prepared using formulations of this type can be cured by heating them at temperatures above about 100° C.

Depending upon the desired end use application, polyesters prepared using the method of the invention can be combined with various additives, including pigments, organic or mineral fillers such as carbon black and calcium carbonate, stabilizers and antioxidants.

Depending upon the reaction conditions employed during the polymerization, the final polyester may either precipitate from the reaction mixture or remain in emulsified form. For certain end use applications, particularly aqueous coating formulations, the final emulsion can be combined with the other components of the formulation, such as pigments and viscosity modifiers, without the need to precipitate the polyester. If it is desired to precipitate the polymer, this is conveniently accomplished by the addition of a water-immiscible nonsolvent such as methanol to a reaction mixture containing the emulsified polymer.

The following examples disclose preferred embodiments of the present invention and should not be interpreted as limiting the scope of the invention as defined in this specification and the accompanying claims. All parts and percentages are by weight unless otherwise specified.

General Polymerization and Evaluation Procedures

The specified amounts of reactants, polycondensation catalyst and water were combined. In some instances the resultant mixture was passed through a Manton Gaulin type 15M 8TA homogenizer manufactured by the Gaulin Corporation, Everett, Mass. 02149, or an ultrasonic cell disruptor. In other instances the emulsion formed spontaneously. The emulsion was reacted under the conditions specified in the examples.

The equivalent weight of the polymer was determined during and following the polymerization reaction by periodically removing aliquot samples from the reaction mixture. Determinations were made using (1) the total aliquot sample and (2) the solid material which precipitated following addition of methanol to a portion of the aliquot sample. In accordance with procedure (1) the aliquot was analyzed by evaporating all of the water present in the sample. The solid residue was then titrated to a phenolphthalein end point using a 0.10 N aqueous solution of sodium hydroxide. An additional 2 cc of sodium hydroxide solution were then added and the resultant mixture heated at a temperature of 50° C. for two minutes. After the sample had cooled to ambient temperature, it was back titrated using 0.10 N aqueous hydrochloric acid. The weight of hydrochloric acid added was subtracted from the total weight of sodium hydroxide added to determine the weight of sodium hydroxide actually required to neutralize all of the acid present in the sample.

The amount of sodium hydroxide solution required to neutralize the carboxylic acid groups present on the polymer is obtained by subtracting the volume of sodium hydroxide solution required for neutralization of any acid type polycondensation catalyst (such as sulfuric acid or dodecylbenzenesulfonc acid) from the total volume of solution required to neutralize all of the acid present in the sample. The equivalent weight of the polymer was calculated using the equation $$\text{Equivalent weight} = \frac{W_t - W_c}{1.0V - W_c/E}$$

where $W_t$ represents the weight of the dry sample $W_c$ represents the weight of the catalyst V represents the volume of sodium hydroxide solution required to neutralize all of the acid present in the sample and E represents the equivalent weight of the catalyst. The terms $W_c$ and E are present only for catalysts that react with sodium hydroxide.

In accordance with the aforementioned procedure (2), a second portion of the aliquot sample was analyzed by evaporating it to dryness and extracting the dried sample with about 30 cc of anhydrous methanol to removal all unreacted monomers and low molecular weight polymer. The solid residue was then dried under reduced pressure and titrated using a 0.10 N aqueous sodium hydroxide solution. Since no catalyst is present, the equivalent weight of the polymer can be calculated using the equation $$\text{Equivalent weight} = W_t/0.1\ V$$

where $W_t$ and V are as previously defined. The relative amount of methanol insoluble polymer is a convenient means for determining the yield of useful polymer.

The number average molecular weight ($\overline{M}_n$) and weight average molecular weight ($\overline{M}_w$) were determined using gel permeation chromatography, a known analytical technique described by H. G. Elias in volume 1 of Macromolecules (p. 338, Plenum Press, New York, 1977). The calibration standard was polystyrene.

The average degree of polymerization ($\overline{D}_p$) for polymers prepared using difunctional carboxylic acids and alcohols was calculated from the number average molecular weight using the equation $\overline{D}_p = 2(\overline{M}_n - 18)/MW_r$ where $MW_r$ is the weight of the repeating unit of the polyester. The equation for calculating the $\overline{D}_p$ value for polyesters derived from hydroxycarboxylic acids is $\overline{D}_p = (\overline{M}_n - 18)/MW_r$.

Gel permeation chromatography data indicate that the equivalent weight of the polymer is approximately equal to the number average molecular weight ($\overline{M}_n$).

EXAMPLE 1

This example demonstrates that useful polyesters can be prepared by emulsion polymerization using a variety of polycondensation catalysts.

A glass reactor equipped with a mechanically driven stirrer, water cooled condenser and a thermometer was charged with 32.40 g. (0.172 mole) azelaic acid, 30.00 g (0.172 mole) 1,10-decanediol, 130 cc distilled water and the type and amount of polycondensation catalyst specified in Table I. The resultant mixture was heated at a temperature of 75° C. for 48 hours while being stirred continuously. At the end of this time the equivalent weight of the total solid material present in the reaction and the portion insoluble in methanol were determined using the two procedures previously described, and the results are reported in Table I together with the number average molecular weight ($\overline{M}_n$) determined using gel permeation chromatography. $\overline{M}_n$ values were obtained for those of the samples listed in Table I, and generally agree with the equivalent weight values. The percentage of the total dried sample that was insoluble in methanol is also reported.

TABLE I

Polyesterification of Azelaic Acid with 1,10-Decanediol Using Various Catalysts

| Catalyst Composition and Amount (g) | Equivalent Weight Total Polymer Solids | Equivalent Weight CH$_3$OH Insoluble Material | Wt. % CH$_3$OH Insoluble Solids | $M_n$ CH$_3$OH Insoluble Solids |
|---|---|---|---|---|
| H$_2$SO$_4$ (1.0) | 592 | 1479 | 22 | — |
| H$_2$SO$_4$ (4.0) | 2606 | 3588 | 65 | 3004 |
| p-toluenesulfonic acid (4.0) | 909 | 1466 | 59 | — |
| DBSA[1] (2.0) | 1099 | 1889 | 67 | — |
| CF$_3$SO$_3$H (4.0) | 1066 | 1540 | 78 | — |
| H$_3$PO$_4$ (6.2) | 753 | 871 | 24 | 728 |
| 5-MNSA[2] (2.0) | 1767 | 2094 | 82 | — |
| LHS[3] (0.5) | 483 | 1200 | 41 | — |
| NaDBSA[4] (2.0) | 1740 | 2296 | 64 | — |
| HCl (3.7) | 673 | 940 | 44 | — |
| H$_2$SO$_4$ (4.0) + Makon® 10[5] (1.5) | 1423 | 2794 | 74 | 1788 |

[1]DBSA = dodecylbenzenesulfonic acid
[2]5-MNSA = 5-methyl-1-naphthylenesulfonic acid
[3]LHS = lauryl hydrogen sulfate
[4]NaDBSA = sodium salt of dodecylbenzenesulfonic acid
[5]An alkylphenoxy polyoxyethylene ethanol The methanol-insoluble polymer has an equivalent weight greater than about 350 g. per equivalent.

EXAMPLE 2

This example demonstrates that glutaric acid and 1,10-decanediol can be reacted at ambient and elevated temperatures to yield useful polyesters in accordance with the method of this invention.

A 74 g (0.56 mole) portion of glutaric acid, 97.6 g (0.56 mole) of 1,10-decanediol and 5.15 g (0.0157 mole) of dodecylbenzenesulfonic acid were dispersed in 323.2 g of hot (50°-70° C.) water. The resultant mixture was heated for 20 minutes at a temperature between 80° and 85° C. and then passed three times through a Manton Gaulin homogenizer under a pressure of 6,000 psi (41.4 megapascals). The homogenizer had been preheated to a temperature of about 50° C. The resultant emulsion was placed in a glass reactor equipped with a water-cooled condenser, mechanically driven stirrer and thermometer and heated at a temperature of 98° C. for 28 hours. A second emulsion prepared in an identical manner was stirred for 500 hours at ambient temperature. In both instances the polymer obtained following removal of the water and other volatile materials exhibited an average degree of polymerization ($\overline{D}_p$) of 3.6. This is considerably higher than the value expected on the basis of the large amount of water present. Since polyesterification is a reversible reaction, most of the polymer initially formed should revert to the corresponding alcohol and carboxylic acid in the presence of excess water. This conclusion is apparent from the foregoing general equation for the esterification reaction.

EXAMPLE 3

This example demonstrates the effect of varying the reaction temperature, reaction time, catalyst concentration and the molar ratio of reactants on the properties of polymers prepared using two water insoluble monomers (azelaic acid and 1,10-decanediol).

The emulsions containing azelaic acid, 1,10-decanediol and dodecylbenzenesulfonic acid (DBSA) were prepared using the general procedure described in example 1. All of the final emulsions contained 34% by weight of nonaqueous material (reactants and polycondensation catalyst). The molar amounts of reagents and catalyst concentration employed together with the reaction conditions, amount of methanol-insoluble material and degree of polymerization are summarized in Table II. The data in this table demonstrate that for the monomers and temperature range evaluated (1) reaction temperature has only a slight effect on the molecular weight of the final polymer, (2) the highest molecular weight is obtained when the reagents are present in equimolar amounts and (3) a slight excess of diol appears preferable to an excess of dicarboxylic acid.

TABLE II

Polymerization of Azelaic Acid and 1,10-Decanediol

| Temp. (°C.) | Moles Diacid/ Moles Diol | Reaction Time (Hours) | % DBSA[1] | Equivalent Weight[2] | $\overline{D}_p$[3] |
|---|---|---|---|---|---|
| 97 | 0.93/0.93 | 48 | 0.65 | 2434 | 14.8 |
| 65 | 0.93/0.93 | 48 | 0.65 | 2310 | 14.0 |
| 65 | 0.97/0.93 | 28 | 0.64 | 1254 | 7.8 |
| 65 | 0.97/0.93 | 21.5 | 3.05 | 1675 | 10.2 |
| 65 | 0.93/0.97 | 21 | 3.06 | 2103 | 12.8 |

[1]Weight % based on monomers
[2]Equivalent weight of total solids
[3]Average degree of polymerization For purposes of comparison, the same diol was reacted with maleic anhydride, which is relatively soluble in water. Since maleic anhydride is too soluble to be emulsifiable, the anhydride was preacted with the diol in the absence of water. A mixture prepared using 34.8 g (0.1997 mole) of 1,10-decanediol, 19.6 g (0.1997 mole) of maleic anhydride and 2.2 g (0.0067 mole) of dodecylbenzenesulfonic acid was heated to its melting point and then combined with 150 cc distilled water. One of the resultant emulsions was reacted at 75° C. and a second at 23° C. for the times specified in Table III.

TABLE III

Polymerization of Oligomeric Maleic Anhydride-1,10-Decanediol Reaction Product

| Reaction Time (hrs.) | Reaction Temperature (°C.) | Equivalent Weight (g/equivalent) |
|---|---|---|
| 0.0 | 75 | 525 |
| 1.0 | 75 | 481 |
| 2.0 | 75 | 432 |
| 3.0 | 75 | 355 |
| 20.0 | 75 | 272 |
| 22.0 | 75 | 245 |
| 0.0 | 80 (initial melt) | 360 |
| 1.0 | 23 | 320 |
| 2.0 | 23 | 675 |
| 3.0 | 23 | 1688 |
| 5.0 | 23 | 2320 |
| 5.16* | 50 | 379 |
| 6.00* | 50 | 356 |

*Temperature of reaction mixture raised to 50° C. after 5.0 hours at 23° C.

The data in the Table III demonstrate that reaction mixtures containing reagents exhibiting a relatively high solubility in water must be reacted at relatively low temperatures for all of the reagents to be emulsifiable. Reversion of the polymer to the original monomers occurs at a higher rate than the polymerization reaction at temperatures above ambient, for example, the equivalent weight of the original oligomer decreased from 525 g/equivalent to 245 g/equivalent over a 22 hour period at a temperature of 75° C. The oligomer reacted to form higher molecular weight polymer at 23° C., as evidenced by the increase in equivalent weight, but reverted to the original oligomer in one hour following an increase in temperature to 50° C.

EXAMPLE 4

This example demonstrates preparation of a polyester from a melt containing phthalic anhydride and 1,10-decanediol.

A glass reactor equipped as described in example 1 was charged with 30.0 g (0.1721 mole) 1,10-decanediol, 25.60 g (0.1721 mole) phthalic anhydride and 2.60 g (0.0080 mole) dodecylbenzenesulfonic acid. The resultant mixture was heated at a temperature of about 70° C. until it became molten, at which time 50 cc of distilled water were added and the resultant emulsion was stirred at ambient temperature (23° C.) for 24 hours. Samples were withdrawn periodically for equivalent weight determinations and the results of these determinations are recorded in Table IV. A second rection mixture was prepared in an identical manner, heated at 80° C. for the same period of time and the equivalent weight of the emulsion determined periodically.

TABLE IV

| Reaction Time (hours) | Equivalent Wt. of Polymer | |
|---|---|---|
| | T = 23° C. | T = 80° C. |
| 0.0 | 331 | 331 |
| 0.5 | 887 | 283 |
| 1.0 | 1269 | 252 |
| 2.0 | 1508 | n.d. |
| 5.0 | 1756 | 269 |
| 7.5 | n.d. | 295 |
| 24.0 | 1975 | 269 | n.d. = not determined

The preceding data indicate that the rate of polymerization at 23° C. is higher than the rate at 80° C. A comparison of the data in tables II, III and IV indicate that while all emulsifiable monomers can be reacted to form polyesters, the optimum reaction conditions for a given combination of reactants may have to be determined emperically.

EXAMPLE 5

This example demonstrates the preparation of a urethane-modified polyester by emulsion polymerization.

A hydroxyl-terminated prepolymer was prepared by dissolving 20.80 g (0.1195 mole) 1,10-decanediol and 16.70 g (0.0096 mole) toluene diisocyanate (a commercially available mixture of the 2,4- and 2,6-isomers) in 26.9 g of tetrahydrofuran. To the resultant solution was added 0.04 g (0.003 mole) benzoyl chloride and 0.02 g (0.00005 mole) stannous dioctoate as catalysts. The resultant mixture was stirred for 24 hours under ambient conditions.

A 10 g (0.0041 mole) portion of the prepolymer product from this reaction was combined with 0.49 g (0.0026 mole) azelaic acid, 0.55 g (0.0017 mole) dodecylbenzenesulfonic acid and 10.33 g distilled water, and the resultant mixture was passed through a sonic cell disruptor. The emulsion which formed was heated with stirring at a temperature of 75° C. for 5 hours.

The number average molecular weight of the precursor and the final polymer were determined using gel permeation chromatography. The value for the prepolymer is 2449 and the value for the air-dried product of the emulsion polymerization is 5666.

A second type of urethane-modified polyester was prepared by reacting 21 g (0.34 mole) ethylene glycol with 17.2 g (0.1 mole) toluene diisocyanate in the presence of 0.3 g (0.0008 mole) of stannous dioctoate as the catalyst. The reaction was continued for 24 hours under ambient conditions. A 11.13 g portion of the resultant prepolymer was combined with 5.58 g (0.03 mole) azelaic acid, 51.5 cc distilled water and 0.5 g dodecylbenzenesulfonic acid as the polycondensation catalyst. The resultant mixture was stirred for 24 hours under ambient conditions. The reaction product was at least partially insoluble in methanol whereas corresponding amounts of both the prepolymer and azelaic acid dissolve in this solvent. The term "corresponding amount" refers to the stoichiometric amounts of reagents required to prepare a given weight of the final polymer.

The equivalent weight of the methanol-insoluble material was 2667. This value is in agreement with the number average molecular weight ($\overline{M}_n$) determined using gel permeation chromatography, which was 2200. The $\overline{M}_n$ value for the prepolymer was 99, indicating that a substantial degree of polymerization had occurred during reaction of the prepolymer with azelaic acid.

EXAMPLE 6

This example demonstrates the preparation of an alkyd resin by emulsion polymerization. A glass reactor equipped with a water-cooled condenser, thermometer and mechanically driven stirrer was charged with 15.1 g (0.10 mole) phthalic anhydride, 25.00 g (0.13 mole) soya fatty acid, 64.5 g (0.40 mole) of a polyol which is an oligomeric reacton product of styrene and allyl alcohol containing an average of 10 repeating units per molecule, 4.00 g (0.012 mole) sodium dodecylbenzene sulfonate and 150 cc water. The resultant mixture was emulsified by heating it for 0.5 hour at 50° C. The emuslion was then allowed to cool to ambient temperature (23° C.) and stirred for 18 hours. At the end of this period the initial emulsion had completely coagulated. The acid number of the precipitated polymer was 36. A stable emulsion was obtained when the procedure was repeated and the reaction mixture was neutralized to a pH of 7 using a 2% aqueous solution of sodium hydroxide.

The precipitated polymer was dried in air at room temperature then dissolved in sufficient toluene to prepare a 50% by weight solution. Following the addition of a conventional curing catalyst composition in an amount equal to 1% by weight based on polymer a film was cast on a metal surface and allowed to air cure for one week. At the end of this period the film exhibited a gloss of 92 (based on a Gardner standard at 60° C.) and a pencil hardness of 6B, determined using ASTM test D3363. The curing catalyst was a mixture of the calcium, cobalt and manganese salts of naphthenic acids in a weight ratio of 5:6:3, based on the metal content of each salt. The combined salts constituted 32% of the catalyst composition, the remaining 68% being identified as an "antiskinning agent."

EXAMPLE 7

This example describes the preparation of a polyester using a trifunctional alcohol as one of the reagents.

A mixture prepared using 11.51 g (0.125 mole) glycerol, 55.55 g (0.375 mole) phthalic anhydride and 4 g (0.0123 mole) dodecylbenzenesulfonic acid was heated at 130° C. for 10 minutes and then allowed to cool. When the temperature of the mixture reached 95° C., 21.68 g (0.188 mole) 1,10-decanediol and 210 cc water were added. The resultant composition was passed through a sonic cell disruptor and the resultant emulsion stirred for 24 hours while being heated at 75° C. and for an additional 24 hours at ambient temperature. The solid portion of the final reaction mixture exhibited an equivalent weight of 370. A 10.0 g portion of the emulsion was combined with 0.6 g of melamine-formaldehyde polymer available as Cymel ® 303 from American Cyanamide Company, Wayne, N.J., and a film was prepared by casting the mixture onto an aluminum plate. The film passed the H pencil hardness test (ASTM test D 3363) after being cured for one hour at 150° C.

EXAMPLE 8

This example demonstrates the preparation of a polyester by emulsion polymerization of a hydroxyacid. A 200 g portion of 12-hydroxystearic acid was combined with 1.1 g dodecylbenzenesulfonic acid, 500.2 g of water that had been preheated to between 85° and 90° C. and 46 g toluene. Heating of the resultant mixture at 85°–90° C. was continued for 30 minutes, at which time the mixture was passed three times through a homogenizer under a pressure of 6000 psi (41.4 megapascals). The homogenizer had been preheated to a temperature of 50° C.

A 400 cc portion of the resultant product was placed in a glass reactor and heated to the boiling point for 7.5 days, during which time the toluene present in the reaction mixture was removed by distillation. At the end of the reaction period the equivalent weight of the total solids present in the reactor was 979, which is equivalent to a degree of polymerization of 3.4. The equivalent weight of the methanol-insoluble material was 1902, which is equivalent to a degree of polymerization of 6.7.

EXAMPLE 9

This example demonstrates the preparation of a polyester using a mixture of either an alkali metal sulfate or sulfuric acid and a cationic surfactant as the polycondensation catalyst.

Azelaic acid and 1,10-decanediol were reacted using the procedure and amounts of reagents specified in example 1. The polycondensation catalysts evaluated were (A) sodium sulfate (2.0 g), (B) sodium hexadecyltrimethyl ammonium sulfate (1.0 g), (C) a mixture of (A) and (B), and (D) a mixture containing 4 g of hexadecyltrimethyl ammonium chloride and 4 g concentrated (96%) sulfuric acid. The yield and equivalent weight of the methanol-insoluble solids obtained were as follows:

| Catalyst | Yield (%) | Equiv. Wt. (g/eq.) |
|---|---|---|
| A | 0 | — |
| B | 1.2 | N.D. |
| C | 46 | 632 |
| D | 45 | 3475 |

N.D. = Not determined.

The equivalent weight of the total solids obtained using catalysts B, C and D were 307, 394 and 1749 g/eq., respectively.

Unexpectedly, sodium sulfate alone yielded no methanol-insoluble polymer yet substantially increased the yield of polymer obtained using the mixed sodium-surfactant salt from 1.2 to 46%.

That which is claimed is:

1. A polyester prepared by (1) combining a liquid aqueous medium with at least one emulsifiable precursor and an effective amount of at least one polycondensation catalyst and (2) reacting the resultant emulsion at a temperature at which the precursor is emulsifiable for a period of time sufficient to form said polyester;

wherein said precursor comprises at least one member selected from the group consisting of hydroxycarboxylic acids containing at least 8 carbon atoms and mixtures comprising a polyfunctional alcohol containing at least 6 carbon atoms and a polyfunctional carboxylic acid containing at least 5 carbon atoms or the corresponding carboxylic acid anhydride and wherein said polycondensation catalyst comprises at least one member selected from the group consisting of mineral acids, organic sulfonic acids, esters of sulfuric acid, alkali metal salts and esters of organic sulfonic acids, alkali metal salts of sulfuric acid half esters wherein the alcohol residue contains at least 12 carbon atoms and mixtures comprising (a) an ester of sulfuric acid wherein the alcohol residue contains at least 12 carbon atoms, an alkali metal salt of a sulfuric acid half ester or a cationic surfactant and (b) an alkali metal salt of sulfuric acid.

2. A polyester according to claim 1 wherein the repeating units of said polyester are selected from at least one member of the group consisting of

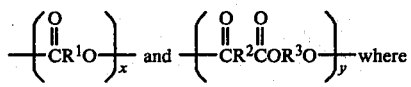

x and y are each 0 or an integer greater than 1, with the proviso that x and y cannot both be 0;

$R^1$ represents hydrocarbylene or substituted hydrocarbylene and is linked to the oxygen atom through an aliphatic or cycloaliphatic carbon atom;

$R^2$ represents a carbon to carbon single bond, hydrocarbylene, substituted hydrocarbylene or a series of at least two hydrocarbylene groups joined by a linking group, and $R^3$ represents hydrocarbylene, substituted hydrocarbylene or a series of at least two hydrocarbylene groups joined by a linking group, and is linked to the two oygen atoms through aliphatic or cycloaliphatic carbon atoms.

3. A polyester according to claim 2 where at least one of $R^2$ and $R^3$ represents a series of at least two hydrocarbylene groups joined by the linking group

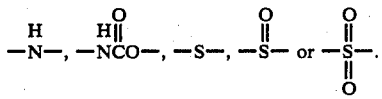

4. A polyester according to claim 2 where $R^1$ represents unsubstituted or substituted alkylene containing from 2 to 20 carbon atoms, unsubstituted or substituted alkenylene containing from 2 to 20 carbon atoms, unsubstituted or substituted cycloalkylene containing from 5 to 8 carbon atoms, $-C_mH_{2m}DC_nH_{2n}-$ or $-C_mH_{2m}EC_nH_{2n}-$ where D is cycloalkylene containing from 5 to 8 carbon atoms, E is arylene and m and n are individually selected integers from 1 to 8, inclusive;

$R^2$ represents a carbon to carbon single bond, substituted or unsubstituted alkylene containing from 1 to 20 carbon atoms, unsubstituted or substituted alkenylene containing from 2 to 20 carbon atoms, unsubstituted or substituted cycloalkylene containing from 5 to 8 carbon atoms, arylene, $-C_pH_{2p}D'C_qH_{2q}-$ or $-C_pH_{2p}E'C_qH_{2q}-$ where D' represents cycloalkylene containing from 5 to 8 carbon atoms, E' represents arylene and p and q are individually selected integers from 1 to 8, inclusive; and $R^3$ represents unsubstituted or substituted alkylene containing from 6 to 20 carbon atoms or $R^3$ is

where $R^4$ is alkylene containing from 2 to 20 carbon atoms, $R^5$ is hydrocarbylene containing from 6 to 20 carbon atoms and r is an integer from 1 to 20.

5. A polyester according to claim 2 or 4 where any substituents present on $R^1$, $R^2$ or $R^3$ are selected from the group consisting of hydrocarbyloxy, thiohydrocarbyloxy, nitro, halo, hydrocarbonyl, hydroxyl, carboxy, isocyanato and amino groups.

6. A polyester according to claim 4 where any arylene is 1,2-, 1,3-, or 1,4-phenylene and any cycloalkylene is 1,2- or 1,4-cyclohexylene.

7. A polyester according to claim 4 where one of x and y is 0 and the other represents an integer from 2 to about 20; $R^1$ is alkylene containing from 8 to 20 carbon atoms; $R^2$ is alkylene containing from 2 to 20 carbon atoms, alkenylene containing from 2 to 8 carbon atoms or phenylene and $R^3$ is alkylene containing from 6 to 20 carbon atoms, hydroxy-substituted alkylene containing from 6 to 20 carbon atoms or

where $R^4$ is alkylene containing from 8 to 12 carbon atoms and $R^5$ is alkarylene.

8. A polyester according to claim 7 where x is 0, $R^2$ is $-CH=CH-$, alkylene containing from 2 to 12 carbon atoms or ortho-phenylene and $R^3$ is alkylene containing from 8 to 12 carbon atoms or the residue remaining following removal of two hydroxyl groups from an oligomeric reaction product of styrene and allyl alcohol containing an average of 10 repeating units per molecule.

9. A polyester according to claim 7 where y is 0 and $R^1$ is alkylene and contains 17 carbon atoms.

10. A polyester according to claim 9 where $R^1$ is

11. A polyester according to claim 1 wherein the concentration of the polyester precursor in the reaction mixture is from 5 to 80% by weight.

12. A polyester according to claim 11 wherein the precursor comprises a difunctional alcohol containing from 6 to 9 carbon atoms and a dicarboxylic acid, and the combined concentrations of said alcohol and dicarboxylic acid constitute from 40 to 80% of the total weight of the reaction mixture.

13. A polyester according to claim 1 wherein the emulsion is reacted at a temperature from 1° to 100° C.

14. A polyester according to claim 13 wherein the precursor is a hydroxycarboxylic acid containing fewer than 12 carbon atoms and the emulsion is reacted at a temperature of from 1° to 40° C.

15. A polyester according to claim 13 wherein the precursor is a polyfunctional alcohol and a polyfunctional acid wherein the acid, the alcohol or both contain fewer than 10 carbon atoms and the emulsion is reacted at a temperature from 1° to about 40° C.

16. A polyester according to claim 1 wherein the polycondensation catalyst is selected from the group consisting of mineral acids, organic sulfonic acids, diesters and half esters of sulfuric acid, alkali metal salts and esters of organic sulfonic acids, alkali metal salts of sulfuric acid half esters and mixtures comprising (a) a first component selected from sulfuric acid esters, alkali metal salts of sulfuric acid half esters and conventional cationic surfactants and (b) a second component selected from the alkali metal salts of sulfuric acid.

17. A polyester according to claim 16 wherein the organic sulfonic acid is methanesulfonic, trifluoromethanesulfonic, benzenesulfonic, p-toluenesulfonic, dodecylbenzenesulfonic, dodecyl diphenyl oxide sulfonic or 5-methyl-1-naphthylene sulfonic acid; the sulfuric acid ester is lauryl hydrogen sulfate; the sodium salt of an aromatic sulfonic acid is sodium dodecylbenzene sulfonate; the alkali metal is sodium; and the cationic surfactant is a quaternary ammonium sulfate or chloride.

18. A polyester according to claim 16 wherein the concentration of the polycondensation catalyst is from 0.01 to 30%, base on the weight of said precursor.

19. A polyester according to claim 18 wherein the concentration of the polycondensation catalyst is from 0.1 to 20%, based on the weight of said precursor.

20. A method for preparing a polyester, the method comprising the steps (1) combining a liquid aqueous medium with at least one emulsifiable precursor and an effective amount of at least one polycondensation catalyst and (2) reacting the resultant emulsion at a temperature at which the precursor is emulsifiable for a period of time sufficient to form said polyester; wherein said precursor comprises at least one member selected from the group consisting of hydroxycarboxylic acids containing at least 8 carbon atoms and mixtures comprising a polyfunctional alcohol containing at least 6 carbon atoms and a polyfunctional carboxylic acid containing at least 5 carbon atoms or the corresponding carboxylic acid anhydride, and wherein said polycondensation catalyst comprises at least one member selected from the group consisting of mineral acids, organic sulfonic acids, esters of sulfuric acid, alkali metal salts and esters of organic sulfonic acids, alkali metal salts of sulfuric acid half esters wherein the alcohol residue contains at least 12 carbon atoms and mixtures comprising (a) an ester of sulfuric acid wherein the alcohol residue contains at least 12 carbon atoms, an alkali metal salt of a sulfuric acid half ester or a cationic surfactant and (b) an alkali metal salt of sulfuric acid.

21. A method according to claim 20 wherein the polyester precursor comprises at least one member selected from the group consisting of HOR$^1$COOH and mixtures of HOOCR$^2$COOH and HOR$^3$OH, where
R$^1$ represents hydrocarbylene or substituted hydrocarbylene and is linked to the oxygen atom through an aliphatic or cycloaliphatic carbon atom;
R$^2$ represents a carbon to carbon single bond, hydrocarbylene, substituted hydrocarbylene or a series of at least two hydrocarbylene groups joined by a linking group, and
R$^3$ represents hydrocarbylene, substituted hydrocarbylene or a series of at least two hydrocarbylene groups joined by a linking group, and is linked to the two oxygen atoms through aliphatic or cycloaliphatic carbon atoms.

22. A method according to claim 21 where at least one of R$^2$ and R$^3$ represents a series of at least two hydrocarbylene groups joined by the linking group $$\overset{H}{-N-},\ \overset{H}{-N}\overset{O}{\overset{\|}{C}}O-,\ -S-,\ -\overset{O}{\overset{\|}{S}}-\ \text{or}\ -\overset{O}{\underset{\|}{\overset{\|}{S}}}-.$$

23. A method according to claim 21 where
R$^1$ represents unsubstituted or substituted alkylene containing from 2 to 20 carbon atoms, alkylene unsubstituted or substituted containing from 2 to 20 carbon atoms, unsubstituted or substituted cycloalkylene containing from 5 to 8 carbon atoms, —C$_m$H$_{2m}$DC$_n$H$_{2n}$— or —C$_m$H$_{2m}$EC$_n$H$_{2n}$— where D is cycloalkylene containing from 5 to 8 carbon atoms, E is arylene and m and n are individually selected integers from 1 to 8, inclusive;
R$^2$ represents a carbon to carbon single bond, substituted or unsubstituted alkylene containing from 1 to 20 carbon atoms, unsubstituted or substituted alkenylene containing from 2 to 20 carbon atoms, unsubstituted or substituted cycloalkylene containing from 5 to 8 carbon atoms, arylene, —C$_p$H$_{2p}$D'C$_q$H$_{2q}$— or —C$_p$H$_{2p}$E'C$_q$H$_{2q}$— where D' represents cycloalkylene containing from 5 to 8 carbon atoms, E' represents arylene and p and q are individually selected integers from 1 to 8, inclusive; and
R$^3$ represents unsubstituted or substituted alkylene containing from 6 to 20 carbon atoms or R$^3$ is

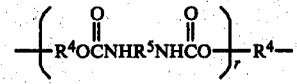

where R$^4$ is alkylene containing from 2 to 20 carbon atoms, R$^5$ is hydrocarbylene containing from 6 to 20 carbon atoms and r is an integer from 1 to 20.

24. A method according to claim 21 or 23 where any substituents present on R$^1$, R$^2$ or R$^3$ are selected from the group consisting of hydrocarbyloxy, thiohydrocarbyloxy, nitro, halo, hydrocarbonyl, hydroxyl, carboxy, isocyanato and amino groups.

25. A method according to claim 23 where any arylene is 1,2-, 1,3- or 1,4-phenylene and any cycloalkylene is 1,2- or 1,4-cyclohexylene.

26. A method according to claim 23 wherein R$^1$ is alkylene containing from 8 to 20 carbon atoms; R$^2$ is alkylene containing from 2 to 20 carbon atoms, alkenylene containing from 2 to 8 carbon atoms or phenylene and R$^3$ is alkylene containing from 6 to 20 carbon atoms, hydroxy-substituted alkylene containing from 6 to 20 carbon atoms or

where R$^4$ is alkylene containing from 8 to 12 carbon atoms and R$^5$ is alkarylene.

27. A method according to claim 26 wherein R$^2$ is —CH=CH—, alkylene containing from 2 to 12 carbon atoms or ortho-phenylene and R$^3$ is alkylene containing from 8 to 12 carbon atoms or the residue remaining following removal of two hydroxyl groups from an oligomeric reaction product of styrene and allyl alcohol containing an average of 10 repeating units per molecule.

28. A method according to claim 26 where R$^1$ is alkylene and contains 17 carbon atoms.

29. A method according to claim 9 where R$^1$ is

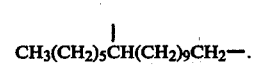

30. A method according to claim 20 wherein the concentration of the polyester precursor in the reaction mixture is from 5 to 80% by weight.

31. A method according to claim 30 wherein the precursor comprises a difunctional alcohol containing from 6 to 9 carbon atoms and a dicarboxylic acid, and the combined concentrations of said alcohol and dicarboxylic acid constitute from 40 to 80%, of the total weight of the reaction mixture.

32. A method according to claim 20 wherein the emulsion is reacted at a temperature from 1° to 100° C.

33. A method according to claim 32 wherein the precursor is a hydrocarboxylic acid containing fewer than 12 carbon atoms and the emulsion is reacted at a temperature of from 1° to 40° C.

34. A method according to claim 32 wherein the precursor is a polyfunctional alcohol and a polyfunctional acid wherein the acid, the alcohol or both contain fewer than 10 carbon atoms and the emulsion is reacted at a temperature from 1° to about 40° C.

35. A method according to claim 20 wherein the polycondensation catalyst is selected from the group consisting of mineral acids, organic sulfonic acids, diesters and half esters or sulfuric acid, alkali metal salts and esters or organic sulfonic acids, alkali metal salts of sulfuric acid half ester and mixtures comprising (a) a first component selected from sulfuric acid esters, alkali metal salts of sulfuric acid half esters and conventional cationic surfactants and (b) a second component selected from the alkali metal salts of sulfuric acid.

36. A method according to claim 35 wherein the organic sulfonic acid is methanesulfonic, trifluoromethanesulfonic, benzenesulfonic, p-toluenesulfonic, dodecylbenzenesulfonic, dodecyl diphenyl oxide sulfonic or 5-methyl-1-naphthylene sulfonic acid; the sulfuric acid ester is lauryl hydrogen sulfate; the sodium salt of an aromatic sulfonic acid is sodium dodecylbenzene sulfonate, the alkali metal is sodium; and the cationic surfactant is a quaternary ammonium sulfate or chloride.

37. A method according to claim 35 wherein the concentration of the polycondensation catalyst is from 0.01 to 30%, based on the weight of said precursor.

38. A method according to claim 37 wherein the concentration of the polycondensation catalyst is from 0.1 to 20%, based on the weight of said precursor.

39. A method according to claim 20 wherein said polyfunctional alcohol is an oligomeric reaction product of a water-soluble nonemulsifiable polyfunctional alcohol and a compound containing a plurality of hydroxyl-reactive functional groups, said reaction product containing an average of from 2 to 5 repeating units per molecule.

40. A method according to claim 20 wherein said polyfunctional carboxylic acid is an oligomeric reaction product of a water-soluble nonemulsifiable polyfunctional carboxylic acid or carboxylic acid anhydride and a compound containing a plurality of carboxyl-reactive functional groups, said reaction product containing an average of from 2 to 5 repeating units per molecule.

* * * * *

UNITED STATES PATENT AND TRADEMARK OFFICE
CERTIFICATE OF CORRECTION

PATENT NO. : 4,355,154
DATED : October 19, 1982
INVENTOR(S) : John C. Saam, Yungnien J. Chou It is certified that error appears in the above-identified patent and that said Letters Patent is hereby corrected as shown below:

In column 19, line 11, "oygen" should read -- oxygen--.

In column 21, lines 63-64, "alkylene unsubstituted or substituted containing" should read -- unsubstituted or substituted alkenylene containing --.

In Column 23, Lines 19 and 20, "or" should read --of--.

Signed and Sealed this

Eighteenth Day of December 1984

[SEAL]

Attest:

GERALD J. MOSSINGHOFF

Attesting Officer

Commissioner of Patents and Trademarks